(12) United States Patent
Mori

(10) Patent No.: US 12,695,851 B2
(45) Date of Patent: Jul. 28, 2026

(54) PROJECTOR APPARATUS, LIGHT SOURCE DEVICE, AND LIGHT SOURCE DRIVE METHOD

(71) Applicant: SONY GROUP CORPORATION, Tokyo (JP)

(72) Inventor: Keita Mori, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 368 days.

(21) Appl. No.: 18/549,505

(22) PCT Filed: Jan. 21, 2022

(86) PCT No.: PCT/JP2022/002166
§ 371 (c)(1),
(2) Date: Sep. 7, 2023

(87) PCT Pub. No.: WO2022/196094
PCT Pub. Date: Sep. 22, 2022

(65) Prior Publication Data
US 2024/0146886 A1 May 2, 2024

(30) Foreign Application Priority Data
Mar. 18, 2021 (JP) ................................. 2021-045038

(51) Int. Cl.
*H04N 9/31* (2006.01)
(52) U.S. Cl.
CPC ........... *H04N 9/312* (2013.01); *H04N 9/3182* (2013.01)

(58) Field of Classification Search
CPC .. G03B 21/005; G03B 21/006; G03B 21/008; G03B 21/28; G03B 21/208;
(Continued)

(56) References Cited

U.S. PATENT DOCUMENTS 9,500,940 B2 * 11/2016 Hung ................. G03B 21/2053
9,918,052 B2 3/2018 Richards
(Continued)

FOREIGN PATENT DOCUMENTS

CN 110275376 A 9/2019
JP 2005-352171 12/2005

OTHER PUBLICATIONS

International Search Report and Written Opinion prepared by the Japan Patent Office on Mar. 23, 2022, for International Application No. PCT/JP2022/002166, 2 pgs.

*Primary Examiner* — Sultan Chowdhury
(74) *Attorney, Agent, or Firm* — SHERIDAN ROSS P.C.

(57) ABSTRACT
A projector apparatus or a light source device includes: a first light source; a second light source, a wavelength of primary color light of the second light source being different from a wavelength of primary color light of the first light source; a phase modulation element to convert light amount distribution of the second light source light; and an amplitude modulation element on which both the first light source light and the second light source light that has passed through the phase modulation element are incident. The signal processing unit generates a drive signal for the amplitude modulation element based on a gamma curve in accordance with a ratio between the first light source light and the second light source light incident on the amplitude modulation element.

20 Claims, 16 Drawing Sheets

(58) Field of Classification Search

CPC .............. G03B 21/145; G03B 21/2013; G03B 21/2033; G03B 21/2053; G03B 21/2066; H04N 9/312; H04N 9/315; H04N 9/3105; H04N 9/3111; H04N 9/3123; H04N 9/3126; H04N 9/3144; H04N 9/3152; H04N 9/3161; H04N 9/3164; H04N 9/3182; H04N 9/3188

See application file for complete search history.

(56)              References Cited

U.S. PATENT DOCUMENTS

| | | | |
|---|---|---|---|
| 10,324,361 B2 * | 6/2019 | Damberg ............. | H04N 9/3182 |
| 11,665,326 B2 * | 5/2023 | Wu ....................... | H04N 9/3194 |
| | | | 353/69 |
| 2007/0252800 A1 | 11/2007 | Abe | |
| 2013/0057661 A1 * | 3/2013 | Oda ....................... | G09G 3/001 |
| | | | 348/51 |
| 2018/0048873 A1 | 2/2018 | Damberg | |
| 2019/0146320 A1 | 5/2019 | Pertierra et al. | |
| 2020/0249492 A1 | 8/2020 | Maes | |
| 2020/0336713 A1 * | 10/2020 | Davies ................... | G02B 27/50 |
| 2023/0019309 A1 * | 1/2023 | Chriki ................. | G03B 21/147 |

* cited by examiner

EXAMPLE OF VOLTAGE vs REFLECTANCE PROPERTIES (VR CURVE)

Fig. 12

| | | FIRST AND SECOND LIGHT SOURCE WAVELENGTH | | | | | | | |
| | | SAME | | | | DIFFERENT | | | |
| | | WHITE BALANCE OF FIRST AND SECOND LIGHT SOURCES | | | | WHITE BALANCE OF FIRST AND SECOND LIGHT SOURCES | | | |
| | | SAME | | DIFFERENT | | SAME | | DIFFERENT | |
| | | PHASE MODULATION ELEMENT | | PHASE MODULATION ELEMENT | | PHASE MODULATION ELEMENT | | PHASE MODULATION ELEMENT | |
| | | LIQUID CRYSTAL | DMD | LIQUID CRYSTAL | DMD | LIQUID CRYSTAL | DMD | LIQUID CRYSTAL | DMD |
| AMPLITUDE MODULATION ELEMENT | LIQUID CRYSTAL | #4 | #4 | #1 | #1 | #2 | #2 | #3 | #3 |
| | DMD | #4 | #4 | #1 | #1 | #4 | #4 | #1 | #1 |

1 IT IS NECESSARY TO CORRECT WHITE BALANCE IN ACCORDANCE WITH RATIO BETWEEN FIRST/SECOND LIGHT AMOUNTS DUE TO SUDDEN INCREASE IN LIGHT AMOUNT

2 IT IS NECESSARY TO CORRECT GAMMA CURVE DUE TO DIFFERENCE IN WAVELENGTHS

3 IT IS NECESSARY TO CONDUCT BOTH #1 AND #2

4 IT IS NOT NECESSARY TO CORRECT COLOR VARIATIONS

PROJECTOR APPARATUS, LIGHT SOURCE DEVICE, AND LIGHT SOURCE DRIVE METHOD

CROSS REFERENCE TO RELATED APPLICATIONS

This application is a national stage application under 35 U.S.C. 371 and claims the benefit of PCT Application No. PCT/JP2022/002166, having an international filing date of 21 Jan. 2022, which designated the United States, which PCT application claimed the benefit of Japanese Patent Application No. 2021-045038, filed 18 Mar. 2021, the entire disclosures of each of which are incorporated herein by reference.

TECHNICAL FIELD

The present technology relates to a projector apparatus, a light source device included in a projector apparatus or the like, and a light source drive method.

BACKGROUND ART

A technology of reproducing an image with desired light intensity distribution by performing amplitude modulation (spatial light intensity modulation) on incident light by using a spatial light modulator (SLM) such as a liquid crystal element or a digital micromirror device (DMD) is known.

In such a field of technology, PTL 1 below discloses a technology of reducing color variations occurring when stack projection is performed by two projectors.

CITATION LIST

Patent Literature

PTL 1: JP 2005-352171 A

SUMMARY

Technical Problem

Incidentally, a technology of projecting a desired reproduced image by performing spatial light phase modulation (which will be simply referred to as "phase modulation" in the present disclosure) on incident light is also known. Although a part of incident light is reduced or blocked when desired light intensity distribution is reproduced in a case where amplitude modulation is performed, it is possible to reproduce desired light intensity distribution without reducing or blocking light in a case of phase modulation.

An object of the present disclosure is to enable occurrence of color variations to be reduced in a case where a projector apparatus using both phase modulation and amplitude modulation by using a plurality of light sources is considered.

Solution to Problem

A projector apparatus according to the present technology includes: a first light source configured to output first light source light; a second light source configured to output second light source light, a wavelength of primary color second light source light being different from a wavelength of primary color light of the first light source; an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on the basis of a gamma curve in accordance with a ratio between the first light source light and the second light source light that are incident on the amplitude modulation element.

A light source device according to the present technology also includes a similar configuration. For example, a case where wavelengths of R light, G light, and B light of the first light source are different from wavelengths of R light, G light, and B light of the second light source due to a difference in light sources themselves is assumed. For example, wavelengths of the R light of the first light source and the R light of the second light source are different from each other. Wavelengths of the G light and the B light are also different between the first light source and the second light source. A case where the wavelengths of the R light, the G light, and the B light are partially different from each other between the first light source and the second light source is also assumed.

In these cases, if the amplitude modulation element generates an amplitude modulation drive signal on the assumption of gradation in accordance with a fixed gamma curve corresponding to the first light source or a fixed gamma curve corresponding to the second light source, amplitude modulation of the gradation that is originally assumed cannot be achieved, and color variations may occur.

Thus, a gamma curve corresponding to the ratio between the first light source light and the second light source light is calculated, and the amplitude modulation drive signal is generated on the basis of the gamma curve.

BRIEF DESCRIPTION OF DRAWINGS

FIG. 9 is an explanatory diagram of an example of color variations.

FIG. 12 is an explanatory diagram of handling of occurrence of color variations according to the embodiment.

DESCRIPTION OF EMBODIMENTS

Hereinafter, embodiments will be described in the following order.
<1. Amplitude modulation and phase modulation in projector apparatus>
<2. Configuration of projector apparatus according to embodiment>
<3. Occurrence and handling of color variations>
<4. Signal processing according to first embodiment>
<5. Signal processing according to second embodiment>
<6. Signal processing according to third embodiment>
<7. Conclusion and modification example>

1. Amplitude Modulation and Phase Modulation in Projector Apparatus

For understanding of embodiments, amplitude modulation and phase modulation in a projector apparatus will be described first.

Figure 1:
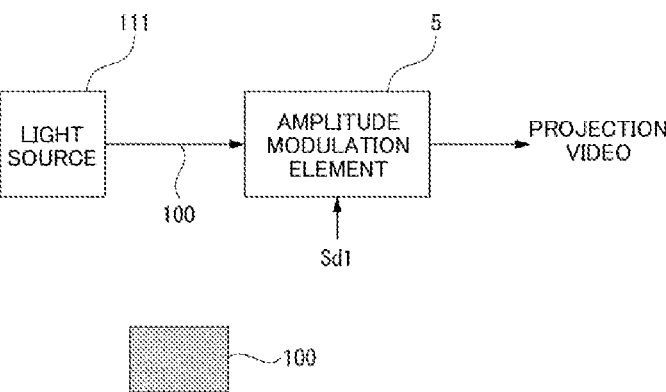
FIG. 1 is an explanatory diagram of a projector configuration using an amplitude modulation element.

FIG. 1 simply illustrates a configuration of a projector (or a light source device) using an amplitude modulation element 5.

Illumination light 100 from a light source 111 is incident on the amplitude modulation element 5 through an optical system, which is not illustrated. The illumination light 100 is light with uniform brightness distribution in an in-plane area as schematically illustrated, and this is temporally or spatially split into R light (red light), G light (green light), and B light (blue light) by the optical system and is incident on the amplitude modulation element 5. The amplitude modulation element 5 emits light forming an image as a projection video by performing light intensity modulation on the incident light for each pixel.

For distinction in explanation, the projector based on this scheme will be referred to as an amplitude modulation-type projector.

Figure 2:
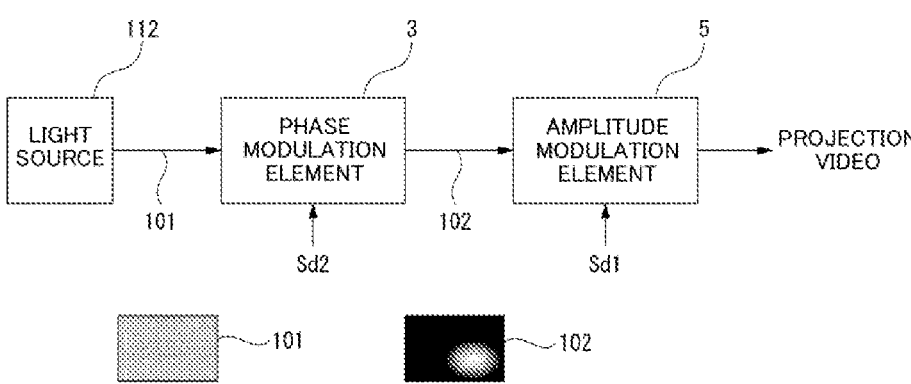
FIG. 2 is an explanatory diagram of a projector configuration using a phase modulation element and an amplitude modulation element.

FIG. 2 simply illustrates a configuration of a projector (or a light source device) using a phase modulation element 3 and the amplitude modulation element 5.

Illumination light 101 from a light source 112 is light with uniform brightness distribution in an in-plane area as schematically illustrated. Phase modulation is performed on the illumination light 101 by the phase modulation element 3 in response to a phase modulation drive signal Sd2. In other words, illumination light 102 with arbitrary distribution is generated by using a diffraction or refraction principle of light. For example, it is also possible to obtain light amount distribution in which a light amount suddenly increases at a part of the in-plane area.

Figure 3:
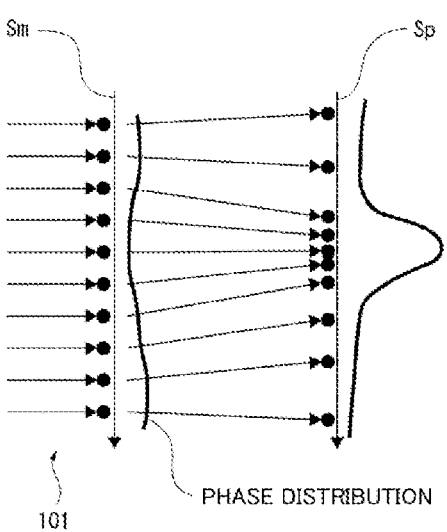
FIG. 3 is an explanatory diagram of operations of the phase modulation element.

FIG. 3 schematically illustrates a relationship of each beam of the illumination light 101 that is incident on a phase modulation plane Sm of the phase modulation element 3, a wave surface of phase distribution in the phase modulation element 3, each beam after phase modulation, and light intensity distribution formed on a virtual projection plane Sp by each beam after the phase modulation.

The wave surface of the phase distribution in accordance with the phase modulation drive signal Sd2 in the phase modulation element 3 has a smooth curve as illustrated in the drawing, for example. Each incident beam is refracted to advance in a normal direction of the wave surface of the phase distribution through spatial light phase modulation achieved by the phase modulation element 3. Through the refraction, a part with increased beam density and a part with sparse beam density are formed on the projection plane Sp, and light intensity distribution is thus formed on the projection plane Sp.

The illumination light 102 on which phase modulation has been performed by the phase modulation element 3 in FIG. 2 is then incident on the amplitude modulation element 5 and is subjected to amplitude modulation in response to an amplitude modulation drive signal Sd1 based on a video signal similarly to the case in FIG. 1, and light forming an image of a projection video is thereby emitted.

For distinction in explanation, the projector based on the scheme in FIG. 2 will be referred to as a phase/amplitude modulation-type projector.

Although unnecessary light is discarded by the amplitude modulation element 5 in the case of the amplitude modulation-type projector as in FIG. 1, it is possible to reduce the amount of light to be discarded by the amplitude modulation element 5 in the later stage by the phase modulation element 3 generating light amount distribution corresponding to an input video signal in the case of the phase/amplitude modulation-type projector as in FIG. 2. It is thus possible to enhance energy efficiency.

Further, the phase/amplitude modulation-type projector can cause a sudden increase in light amount by collecting light from a dark area to a bright area in the in-plane part and thus enlarge a dynamic range of a projection video.

2. Configuration of Projector Apparatus According to Embodiment

A configuration of a projector apparatus (or a light source device) according to an embodiment will be described in consideration of the above configurations in FIGS. 1 and 2. The projector apparatus according to the embodiment can be referred to as a hybrid-type projector as a combination of the amplitude modulation-type projector in FIG. 1 and the phase/amplitude modulation-type projector in FIG. 2.

Figure 4:
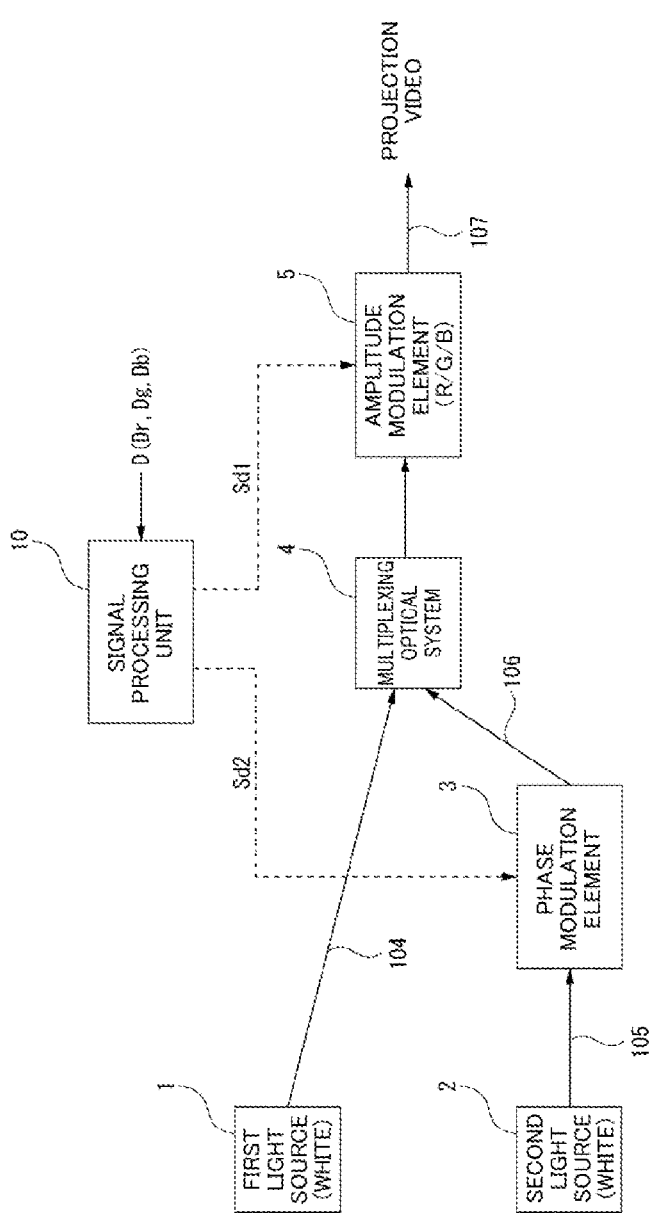
FIG. 4 is an explanatory diagram of a main part configuration of a projector apparatus according to an embodiment.

An outline of the configuration of the hybrid-type projector (or a light source device) according to the embodiment is illustrated in FIG. 4.

As illustrated in the drawings, the hybrid-type projector according to the embodiment has a first light source 1 (hereinafter, referred to as a "light source 1") and a second light source 2 (hereinafter, referred to as a "light source 2").

The light source 1 is a light source corresponding to the light source 111 in the configuration of the amplitude modulation-type projector in FIG. 1, and a fluorescent light source, for example, is used. Illumination light from the light source 1 will be referred to as first light source light 104. The light source 2 is a light source corresponding to the light source 112 in the configuration of the phase/amplitude modulation-type projector in FIG. 2, and a laser light source, for example, is used. Illumination light from the light source 2 will be distinguished before and after the phase modulation element 3 and will be referred to as second light source light 105 or second light source light 106.

Note that the light sources 1 and 2 are not limited to the fluorescent light source and the laser light emitting element, and it is also possible to use other light emitting elements such as light emitting diodes (LEDs), for example.

The first light source light 104 from the light source 1 is incident on the amplitude modulation element 5 via a multiplexing optical system 4. The amplitude modulation element 5 is formed of a liquid crystal panel or a DMD (a DMD that performs amplitude modulation) of a reflection type or a transmission type.

On the other hand, the second light source light 105 from the light source 2 is incident on the phase modulation element 3. The phase modulation element 3 is configured of a liquid crystal panel or a DMD of a reflection type or a transmission type. However, the DMD in this case is not a typical DMD in which each pixel is inclined and bends light but a phase modulation DMD in which each pixel shifts in the normal direction and changes the phase amount of light. Also, the phase modulation element 3 performs phase modulation on the incident light such that it has arbitrary distribution by using a diffraction or refraction principle of light as described shown above in FIG. 3 and then outputs the light. Therefore, the second light source light 106 emitted from the phase modulation element 3 is light obtained by performing phase modulation on the second light source light 105.

The second light source light 106 is incident on the amplitude modulation element 5 via the multiplexing optical system 4.

Therefore, the first light source light 104 and the second light source light 106 are multiplexed and are then incident on the amplitude modulation element 5.

The amplitude modulation element 5 performs light intensity modulation of each pixel by using an amplitude modulation drive signal Sd1 based on a video signal and emits projection video light 107. In this manner, a projection video based on the video signal is displayed on a screen surface, which is not illustrated.

As illustrated in FIG. 4, the hybrid-type projector according to the embodiment has both the configuration of the amplitude modulation-type projector configured of the light source 1 and the amplitude modulation element 5 and the configuration of the phase/amplitude modulation-type projector configured of the light source 2, the phase modulation element 3, and the amplitude modulation element 5.

Also, a signal processing unit 10 that generates the phase modulation drive signal Sd2 to be supplied to the phase modulation element 3 and the amplitude modulation drive signal Sd1 to be supplied to the amplitude modulation element 5 is included.

The signal processing unit 10 can be configured to include a microcomputer including, for example, a central processing unit (CPU), a read only memory (ROM), a random access memory (RAM), and the like.

The signal processing unit 10 calculates phase distribution of the phase modulation element 3 on the basis of an input video signal D. Then, the signal processing unit 10 supplies the phase modulation drive signal Sd2 to the phase modulation element 3 in accordance with the calculated phase distribution and controls the phase modulation operation. Specifically, phase modulation to reduce light density in an area with low luminance and increase light density in an area with high luminance in a video plane projected by the video signal D is enabled.

Note that the video signal D is, for example, an RGB signal including an R signal Dr, a G signal Dg, and a B signal db.

Additionally, the signal processing unit 10 generates the amplitude modulation drive signal Sd1 for controlling amplitude modulation of each pixel of the amplitude modulation element 5 on the basis of the input video signal D and supplies it to the amplitude modulation element 5. In this manner, the amplitude modulation element 5 performs amplitude modulation in accordance with luminance designated by the video signal for each pixel and generates projection video light 107 in accordance with the video signal D.

Figure 5:
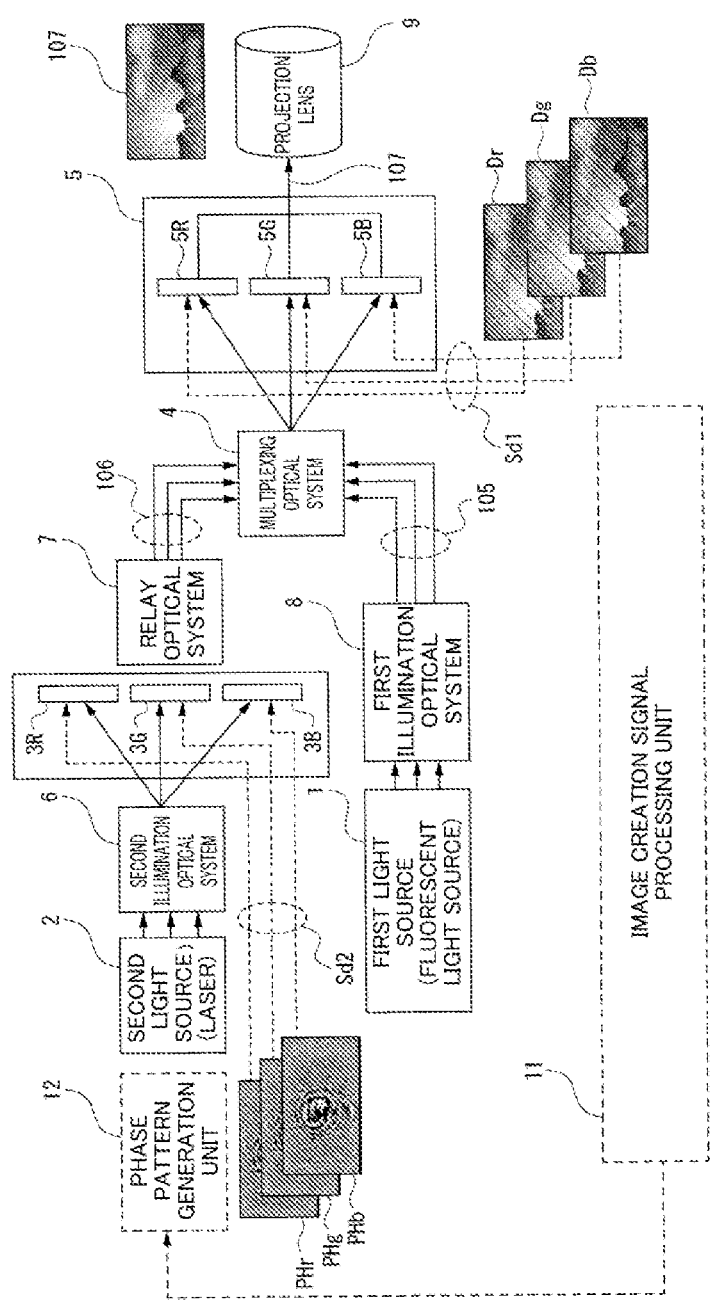
FIG. 5 is an explanatory diagram of a detailed configuration of the projector apparatus according to the embodiment.

Although FIG. 4 above is simplified for comparison with FIGS. 1 and 2, a more detailed configuration of the projector according to the embodiment is illustrated in FIG. 5.

For example, the light source 1 and a first illumination optical system 8 as fluorescent light sources are formed.

Light from the light source 1 is white light, is split into R light, G light, and B light by the first illumination optical system 8, and is then guided to the multiplexing optical system 4.

Additionally, laser light sources form the light source 2 and a second illumination optical system 6, for example.

Light from the light source 2 is white light, is split into R light, G light, and B light by the second illumination optical system 6, and is guided to the phase modulation element 3.

The phase modulation element 3 is provided with a phase modulation element 3R corresponding to the R light, a phase modulation element 3G corresponding to the G light, and a phase modulation element 3B corresponding to the B light. Phase modulation is performed on the R light from the second illumination optical system 6 by the phase modulation element 3R, phase modulation is performed on the G light by the phase modulation element 3G, and phase modulation is performed on the B light by the phase modulation element 3B.

The R light, the G light, and the B light after the phase modulation correspond to the aforementioned second light source light 106 and are input to the multiplexing optical system 4.

The multiplexing optical system 4 multiplexes the R light, the G light, and the B light of each of the first light source light 104 and the second light source light 106 and guides each of them to the amplitude modulation element 5.

The amplitude modulation element 5 is provided with an amplitude modulation element 5R corresponding to the R light, an amplitude modulation element 5G corresponding to the G light, and an amplitude modulation element 5B corresponding to the B light. Amplitude modulation is performed on the multiplexed R light by the amplitude modulation element 5R, amplitude modulation is performed on the multiplexed G light by the amplitude modulation element 5G, and amplitude modulation is performed on the multiplexed B light by the amplitude modulation element 5B.

Then, the R light, the G light, and the B light after the amplitude modulation are synthesized as projection video light 107 and are then subjected to video projection by a projection lens 9.

In FIG. 5, an image creation signal processing unit 11 and a phase pattern generation unit 12 illustrated by dashed lines are processing functions realized by software in the signal processing unit 10 illustrated in FIG. 4.

The image creation signal processing unit 11 generates an amplitude modulation drive signal Sd1 for each of the amplitude modulation elements 5R, 5G, and 5B on the basis of input video signals D (Dr, Dg, db).

In addition, the image creation signal processing unit 11 generates phase distribution to be realized in the phase modulation elements 3R, 3G, and 3B on the basis of the input video signals D (Dr, Dg, db).

The phase pattern generation unit 12 generates phase pattern signals PHr, PHg, and PHb for causing the phase modulation elements 3R, 3G, and 3B to execute phase modulation, respectively, from the phase distribution based on the video signals Dr, Dg, and db and outputs these as phase modulation drive signals Sd2 to the phase modulation elements 3R, 3G, and 3B.

Note that specific processing examples of the signal processing unit 10 including the image creation signal processing unit 11 and the phase pattern generation unit 12 will be described later as signal processing according to first, second, and third embodiments.

With the above configuration in FIG. 5, the hybrid-type projector using primary color light of each of R light, G light, and B light is realized.

3. Occurrence and Handling of Color Variations

Here, color variations in the hybrid-type projector as described above will be described.

As an example, a case where an input video signal D is a signal for a gradation video of a grayscale will be considered.

Figures 6A, 6B, 6C:
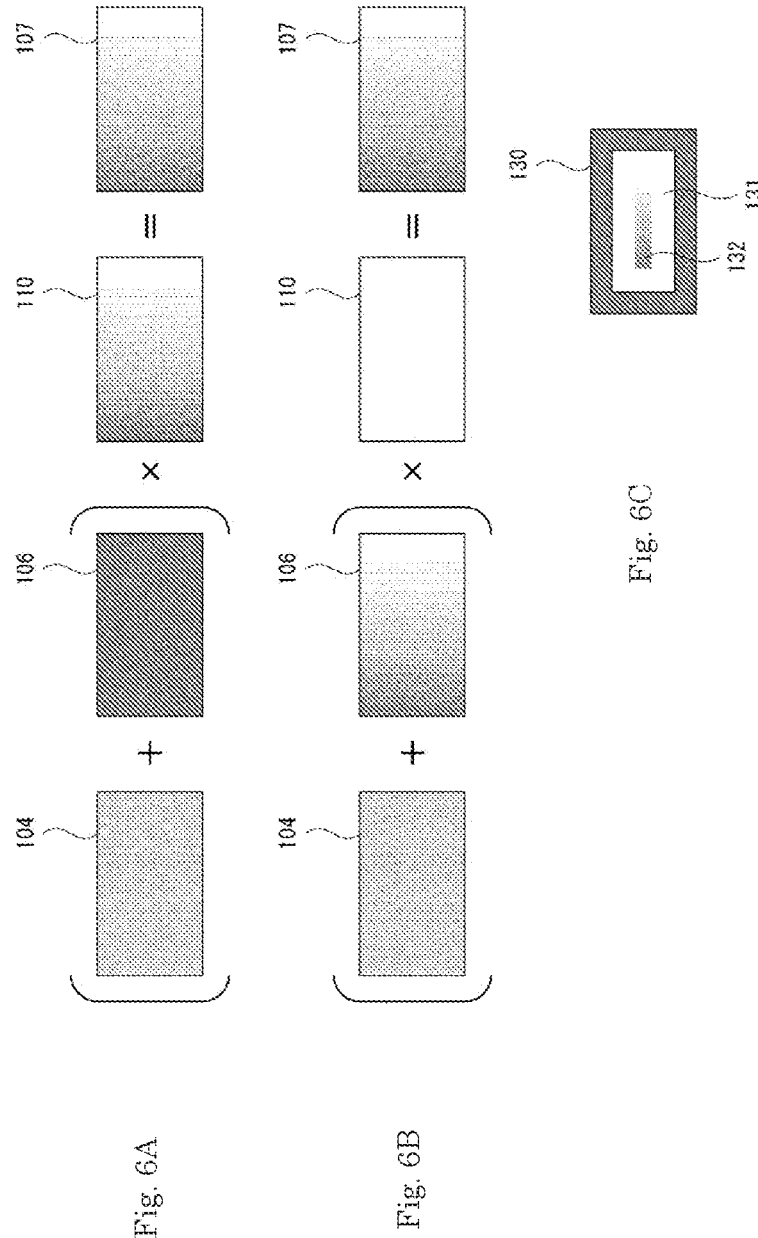
FIGS. 6A, 6B, 6C are explanatory diagrams of light amount distribution at each part according to the embodiment.

FIGS. 6A and 6B illustrate the first light source light 104 and the second light source light 106 which is obtained after phase modulation being incident on the amplitude modulation element 5.

Note that although an example in which the amplitude modulation element 5 controls reflectance on the assumption of using a reflection-type liquid crystal panel or DMD as the amplitude modulation element 5 will be described in the following embodiments, it is possible to rephrase the following explanation parts regarding the reflectance as transmittance in a case where a transmission-type liquid crystal panel is used.

In the case of the hybrid-type projector as in FIG. 4, it is basically desired to generate light amount distribution corresponding to gradation by the second light source light 106 after passing through the phase modulation element 3 as illustrated in FIG. 6B and to set the maximum transmittance or reflectance in the amplitude modulation element 5 so as not to discard light. Setting the maximum reflectance in the amplitude modulation element 5 means setting reflectance distribution 110 of the amplitude modulation element 5 controlled by the amplitude modulation drive signal Sd1 to a maximum value uniformly in the in-plane part as illustrated in the drawing. In this manner, the projection video light 107 becomes light projecting the gradation as in the drawing.

On the other hand, it is also considered that the second light source light 106 is caused to have uniform light amount distribution as illustrated in FIG. 6A and the amplitude modulation element 5 generates reflectance distribution in the gradation form.

It is difficult to generate light amount distribution having high spatial resolution equivalent to that of pixels of the amplitude modulation element 5 in the second light source light 106 due to properties of the phase modulation element 3. On the other hand, it is possible to modulate incident light for each pixel in the case of the amplitude modulation element 5.

For example, a case where there is a bright area 131 (low spatial frequency) in a dark background 130 and the area 131 has a narrow area 132 (high spatial frequency) in a gradation form in it as illustrated in FIG. 6C will be considered. In this case, the bright area 131 in the dark background 130 can be realized with the light amount of the second light source light 106, and the narrow area 132 in it can be realized by the amplitude modulation element 5.

Since color variations in the hybrid-type projector and handling thereof will be considered by exemplifying the narrow area 132 in such a case, the case of FIG. 6A in which the entire screen has gradation and it is realized with the reflectance of the amplitude modulation element will be used for the following description for simplicity.

In a case where the wavelengths of the R light, the G light, and the B light of each of the light source 1 and the light source 2 and the white points of the light source 1 and the light source 2 are the same in the hybrid-type projector with the aforementioned configuration in FIGS. 4 and 5, white points in the in-plane area do not change if the first light source light 104 and the second light source light 106 which is obtained after phase modulation are added up. Therefore, the white points of an image finally generated also do not change, and no color variations occur, if the reflectance of each of the colors R, G, and B of each pixel is the same in the amplitude modulation element 5.

Note that the "wavelength" of the primary color light, such as the R light, the G light, and the B light, in the present disclosure means a main wavelength that is the most dominant wavelength in a case of a light source having a certain wavelength width for one color.

On the other hand, in a case where the wavelengths of the R light, the G light, and the B light of each of the light source 1 and the light source 2 are different from each other and a liquid crystal is used as the amplitude modulation element, color variations occur even if the white points are the same.

This is because reflectance properties of the liquid crystal with respect to a voltage (hereinafter, a VR curve) are different for different wavelengths even in a case of the same color.

For example, wavelengths of each color are different between the light source 1 and the light source 2 as follows.

Wavelength of B light . . . light source 1: 445 nm, light source 2: 462 nm

Wavelength of G light . . . light source 1: 555 nm, light source 2: 520 nm

Wavelength of R light . . . light source 1: 610 nm, light source 2: 635 nm

Figure 7:
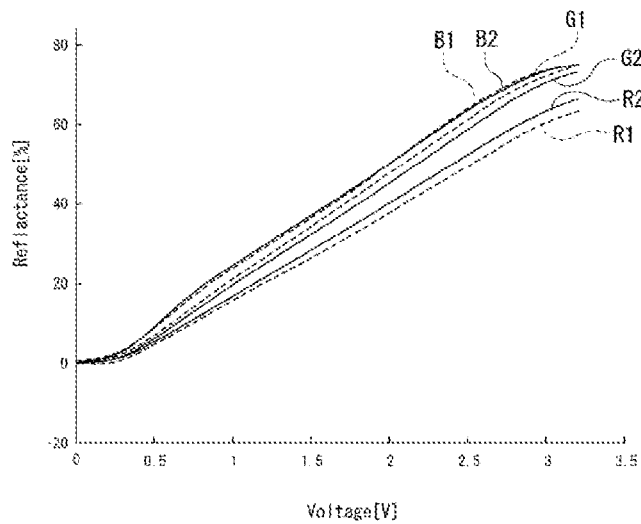
FIG. 7 is an explanatory diagram of a wavelength of primary color light of each light source according to the embodiment.

In this case, each VR curve is as illustrated in FIG. 7. In FIG. 7, the R light (R1), the G light (G1), and the B light (B1) of the light source 1 are illustrated by the dashed lines, and the R light (R2), the G light (G2), and the B light (B2) of the light source 2 are illustrated by the solid lines.

Here, if the case of the amplitude modulation-type projector as in FIG. 1 is considered, the VR curve is measured for each of the R light, the G light, and the B light, and a relation ship (gamma table) of a voltage with respect to gradation is determined through adjustment from a relationship of reflectance with respect to gradation (a gamma curve, for example, reflectance=gradation to the power of 2.2).

However, in the case of the hybrid-type projector according to the present embodiment, light amount distribution of the second light source light 106 is different for each frame of the video. In a case where the light amount distribution of the second light source light 106 is not uniform for a certain frame, the ratio between the light amounts of the first light source light 104 and the second light source light 106 differs for each pixel in the stage of the amplitude modulation element 5.

In other words, since light is caused to move to another area through phase modulation, pixels where substantially no light from the light source 2 is present and pixels where the light from the light source 2 concentrates occur in the distribution of the second light source light 106 in the phase modulation element 3. In the pixels where substantially no light from the light source 2 is present, the VR curve of the amplitude modulation element 5 is substantially equal to the VR curve in a case where only the light source 1 is turned on.

On the other hand, pixels in an area where the light from the light source 2 is extremely collected and the light amount suddenly increases in the second light source light 106 are pixels where the amount of light from the light source 2 is much more than light from the light source 1. Since the light from the light source 1 can be ignored in this case, the VR curve of the pixels is substantially equal to the VR curve in the case where only the light source 2 is turned on.

In other words, a substantial VR curve differs for each frame and each pixel and changes in accordance with a proportion between the light from the light source 1 and the light from the light source 2. Therefore, the VR curve is a curve between the VR curve in a case where only the light source 1 is turned on and the VR curve in the case where only the light source 2 is turned on.

In a case where the VR curve changes, the gamma curve also changes. This state is illustrated in FIG. 8.

Figure 8:
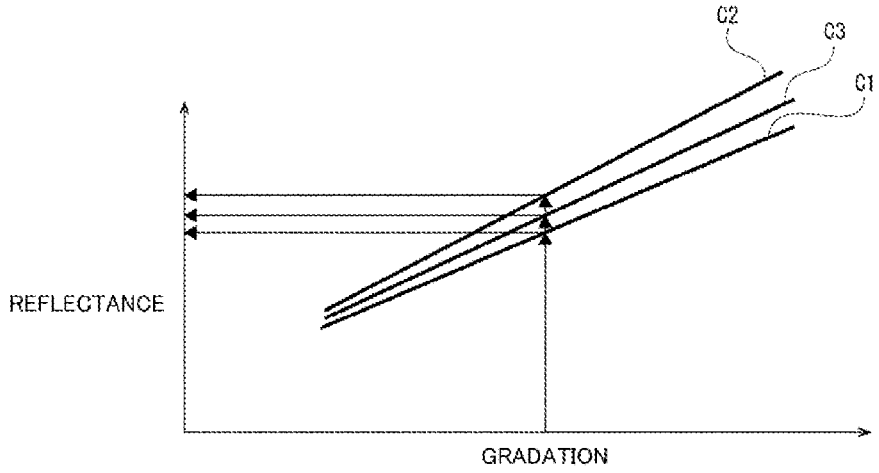
FIG. 8 is an explanatory diagram of a principle of occurrence of color variations.
Figure 6:
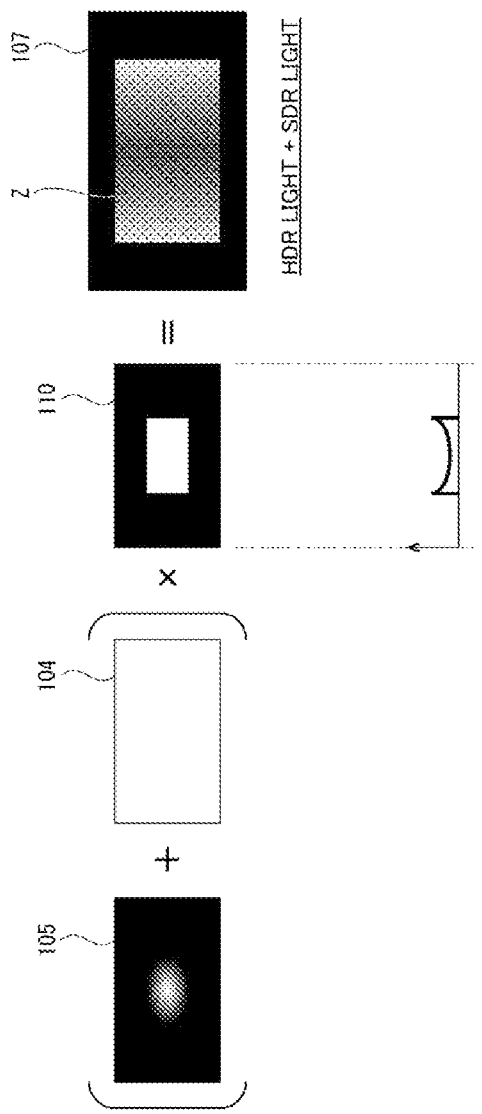

FIG. 8 illustrates a gamma curve C1 of a certain color of the amplitude modulation element 5 in the case where only the light source 1 is turned on and a gamma curve C2 of a certain color of the amplitude modulation element 5 in the case where only the light source 2 is turned on. Additionally, an intermediate gamma curve C3 is illustrated.

Now, even if an amplitude modulation drive signal of a certain voltage value is given to realize certain gradation in a certain pixel, the reflectance of the pixel differs depending on the gamma curves C1, C2, and C3. Therefore, even if the same gradation control is performed on each pixel of the amplitude modulation drive signal, the reflectance of each pixel differs depending on the ratio of the light amounts of the first light source light 104 and the second light source light 106 in each pixel, and color variations occur.

Note that in a case where the white points in the highest gradation are caused to coincide between the light source 1 and the light source 2, there are no changes in white points regardless of the light amount of the light source 2 in the highest gradation. However, color variations occur depending on the light amount of the light from the light source 2 due to the aforementioned reasons in gradation below the highest gradation.

A specific example of color variations is illustrated in FIG. 9. FIG. 9 illustrates a case where the first light source light 104 and the second light source light 106 are multiplexed and the multiplexed light is incident on the amplitude modulation element 5 in which reflectance of each pixel is controlled with the reflectance distribution 110 in accordance with the amplitude modulation drive signal Sd1.

Note that a video in this case is assumed to be a video including a rectangle with high luminance located at the center and the surroundings with low luminance. Also, phase modulation is performed on the second light source light 106 by the phase modulation element 3 such that the rectangle at the center gets to have high luminance. However, since it is difficult to control the light amount with high spatial resolution depending on phase modulation, the second light source light 106 has light amount distribution in which edges of the center area are blur.

As the amplitude modulation drive signal in this case, a signal for controlling the reflectance at the center to be lower than that at the edge part even in the area with high luminance as illustrated is adopted. In this manner, the video based on the projection video light 107 becomes a video with the rectangle with high luminance at the center.

However, the ratio of the light amounts of the first light source light 104 and the second light source light 106 that are incident on each pixel differs in the rectangle center area. Therefore, color variations Z as schematically illustrated in the drawing occurs.

Figure 10:
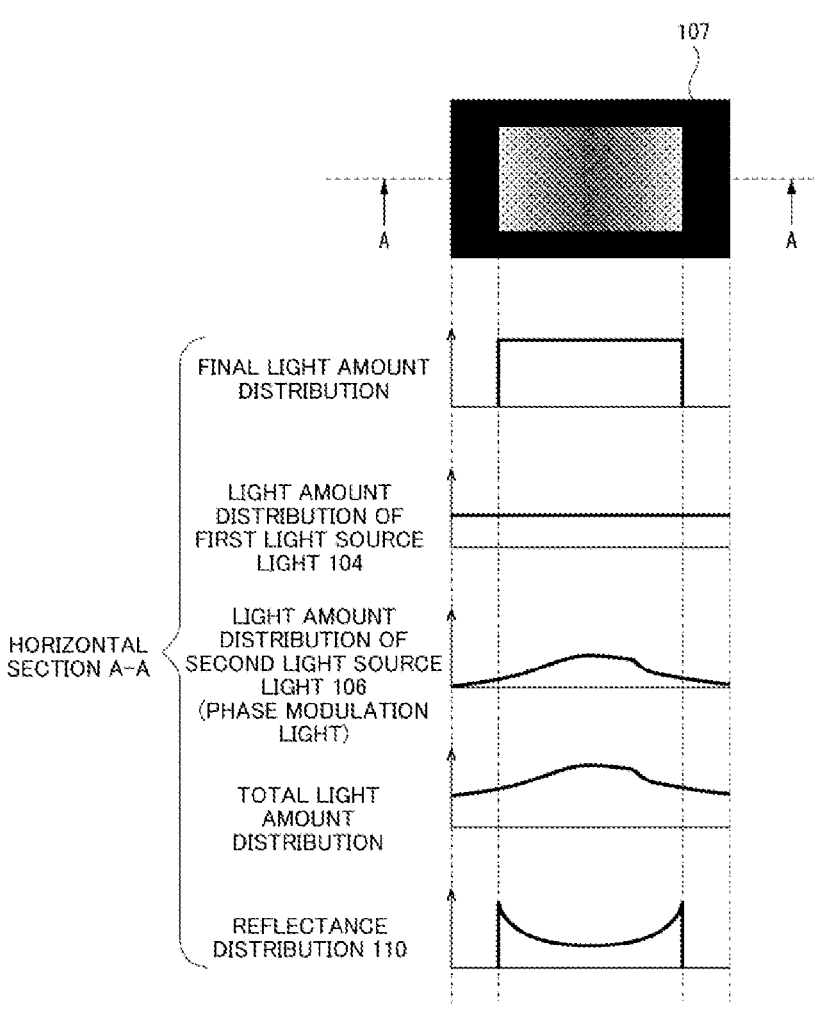
FIG. 10 is an explanatory diagram of an example of color variations.

FIG. 10 illustrates a difference in light amount distribution in detail. Each distribution is illustrated along the section A-A of the projection video light 107 in the horizontal direction. The first light source light 104 has uniform light amount distribution in the plane, and the light amount distribution is flat even when it is seen along the section A-A.

The second light source light 106 is assumed to have light amount distribution along the section A-A as illustrated by being subjected to phase modulation in accordance with the video.

The total light amount distribution is distribution of light that is incident on the amplitude modulation element 5 and is a sum of the first light source light 104 and the second light source light 106.

The light amount distribution of the projection video light 107 becomes the light amount distribution in accordance with the video as illustrated as final light amount distribution by the amplitude modulation element 5 being controlled with the reflectance distribution 110 as illustrated in the bottom level for the incident light illustrated with the total light amount distribution.

However, since the second light source light 106 has light amount distribution increasing at the center, the ratio of the light amounts of the first light source light 104 and the second light source light 106 differs for each pixel in the rectangular center area. Therefore, color variations Z occur.

In the present embodiment, processing of reducing or canceling such color variations is performed.

Figure 11:
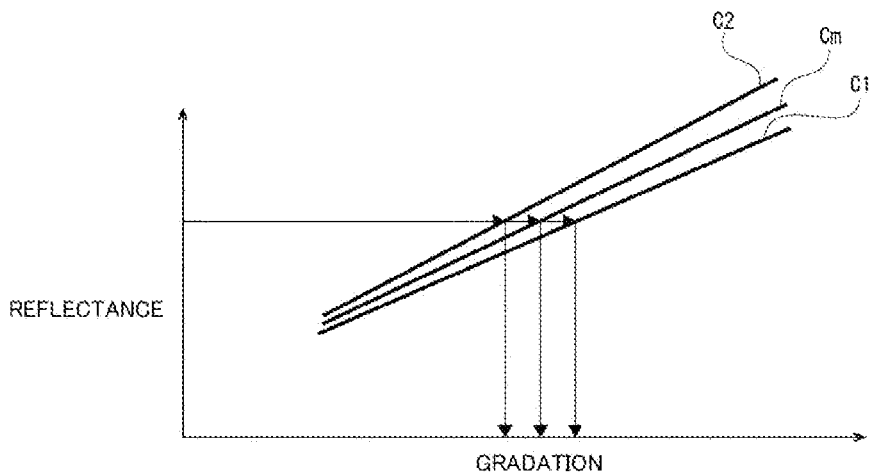
FIG. 11 is an explanatory diagram of a method for reducing color variations according to the embodiment.

FIG. 11 illustrates the gamma curves C1 and C2 similarly to FIG. 8. In the present embodiment, a gamma curve Cm is calculated in accordance with the ratio of light amounts when both the light sources 1 and 2 are turned on, from the gamma curve C1 of the amplitude modulation element 5 when only the light source 1 is turned on and the gamma curve C2 of the amplitude modulation element 5 when only the light source 2 is turned on, which are measured in advance as illustrated in FIG. 11.

The gamma curve Cm changes depending on the ratio of the light amounts of the light source 1 and the light source 2. In other words, a property closer to the gamma curve C1 is obtained as the ratio of the light amount of the light source 1 increases, and a property closer to the gamma curve C2 is obtained as the ratio of the light amount of the light source 2 increases.

As will be described later, there are also an example in which the gamma curve is statically calculated and an example in which the gamma curve is dynamically calculated for each frame, for pixel image and, or the like.

Then, necessary gradation is obtained from a desired reflectance by using the gamma curve. Although the drawing illustrates that the gradation differs depending on the gamma curve on the assumption of a certain reflectance, this illustrates that the voltage value of the amplitude modulation drive signal is adjusted in accordance with the employed gamma curve in accordance with the assumed reflectance.

It is possible to obtain the reflectance assumed for each color by performing the processing for each of the colors R, G, and B and to eliminate occurrence of color variations as a result.

Incidentally, it is possible to use a liquid crystal panel or a DMD as the amplitude modulation element 5. Further, it is also possible to assume some types of properties of the light source 1 and the light source 2.

Thus, configurations of an apparatus to which application of the present technology is assumed and types of color variation correction for it will be described here.

First, the following two items are conceivable as properties of the light sources.

Whether the color wavelengths of each of R, G, and B are the same or different between the light source 1 and the light source 2

Whether white points (white balances) of the light source 1 and the light source 2 are the same or different Next, the following two items can be considered from the viewpoint of devices used as the phase modulation element 3 and the amplitude modulation element 5.

Whether to use a liquid crystal panel or use a DMD as the phase modulation element 3

Whether to use a liquid crystal panel or use a DMD as the amplitude modulation element 5

On the basis of this, a total of sixteen types of configurations are conceivable as illustrated in FIG. 12.

These configurations can be roughly categorized as one for a case where it is not necessary to correct color variations illustrated as "#4" in the drawing and one for a case where it is necessary to correct color variations illustrated as "#1", "#2", and "#3".

The one for the case where it is necessary to correct color variations can be further categorized into three types, namely correction of white points of "#1", correction of the gamma curve of "#2", and correction of both the white points of "#3" and the gamma curve. These will be described below.

1

In a case where the wavelengths of each of R, G, and B are the same between the light source 1 and the light source 2 and the white points of both the light sources 1 and 2 are different, performing correction of the white points in accordance with the ratio between the first light source light 104 and the second light source light 106 is appropriate.

Similarly, performing correction of the white points is also appropriate even in a case where the wavelengths of each of R, G, and B are different between the light source 1 and the light source 2, the white points of both the light sources 1 and 2 are different, and DMD is used as the amplitude modulation element 5.

2

In a case where the wavelengths of each of R, G, and B are different between the light source 1 and the light source 2, the white points of both the light sources 1 and 2 are the same, and a liquid crystal panel is used as the amplitude modulation element 5, performing correction of color variations by calculating a gamma curve in accordance with the ratio between the first light source light 104 and the second light source light 106 is appropriate.

3

In a case where the wavelengths of each of R, G, and B are different between the light source 1 and the light source 2, the white points of both the light sources 1 and 2 are different, and a liquid crystal panel is used as the amplitude modulation element 5, correction of color variations in consideration of both the white points and the gamma curve is appropriate.

4

In a case where the wavelengths of each of R, G, and B are the same between the light source 1 and the light source 2, and the white points of both the light sources 1 and 2 are the same, the gamma curves and the white points are also the same, the gamma carves and the white points thus do not depend on the ratio between the first light source light 104 and the second light source light 106, and it is not necessary to perform color variation correction.

For a DMD, it does not have wavelength dependency, the light source 1 and the light source 2 thus have different wavelengths, the white points of both the light sources 1 and 2 are caused to coincide with each other, and even in a case where the DMD is used as the amplitude modulation element 5, it is not necessary to perform color variation correction.

4. Signal Processing According to First Embodiment

As a signal processing example according to a first embodiment, an example in which color variation correction is statically performed will be described by using FIG. 13. The processing in FIG. 13 is illustrated as a case where the wavelengths and the white balances of primary color light are different between the light source 1 and the light source 2 and a liquid crystal panel is used as the amplitude modulation element 5.

Note that the processing according to each embodiment described below in FIGS. 13 to 16 is an example of signal processing executed by the signal processing unit 10 in FIG. 4 including the image creation signal processing unit 11 and the phase pattern generation unit 12 as in FIG. 5 for each frame of the video signal D.

Figure 13:
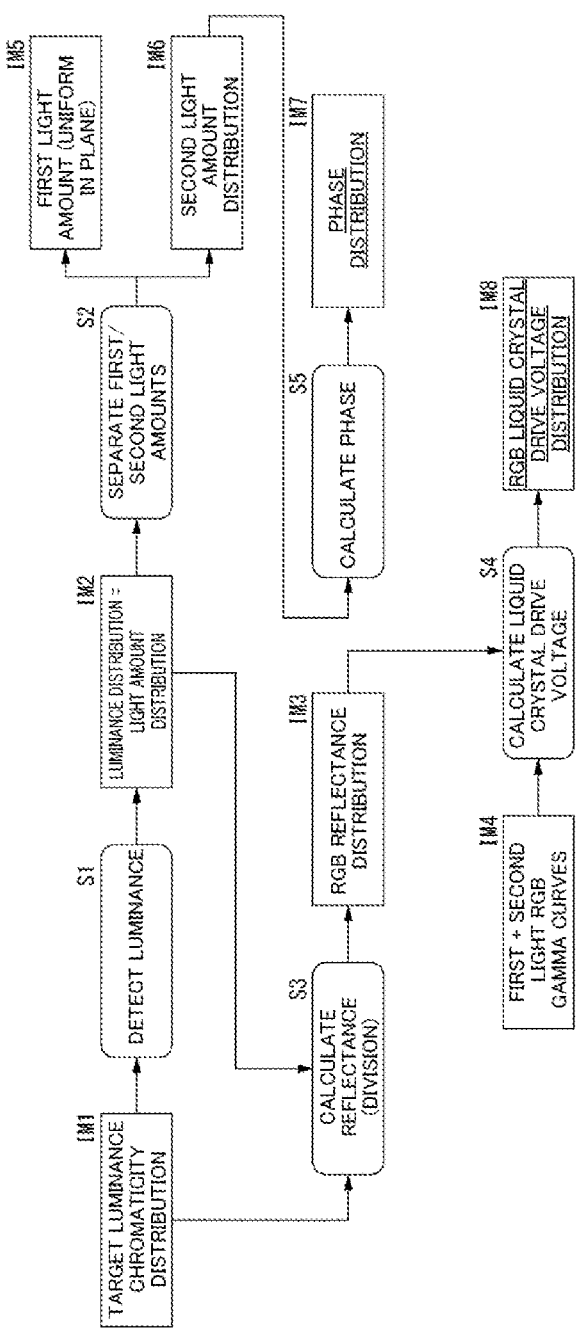
FIG. 13 is an explanatory diagram of signal processing according to a first embodiment.
Figure 14:
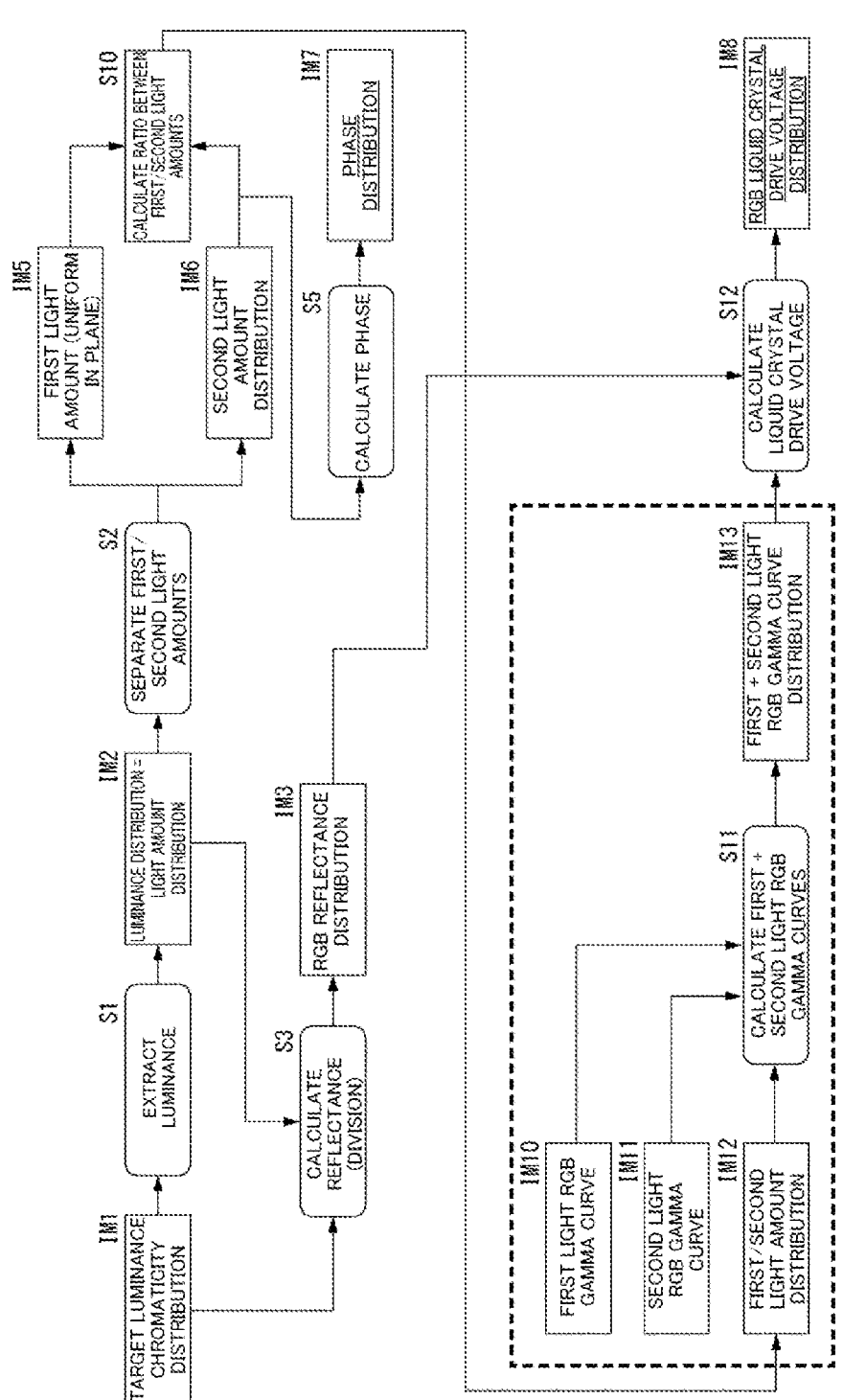
FIG. 14 is an explanatory diagram of signal processing according to a second embodiment.
Figure 16:
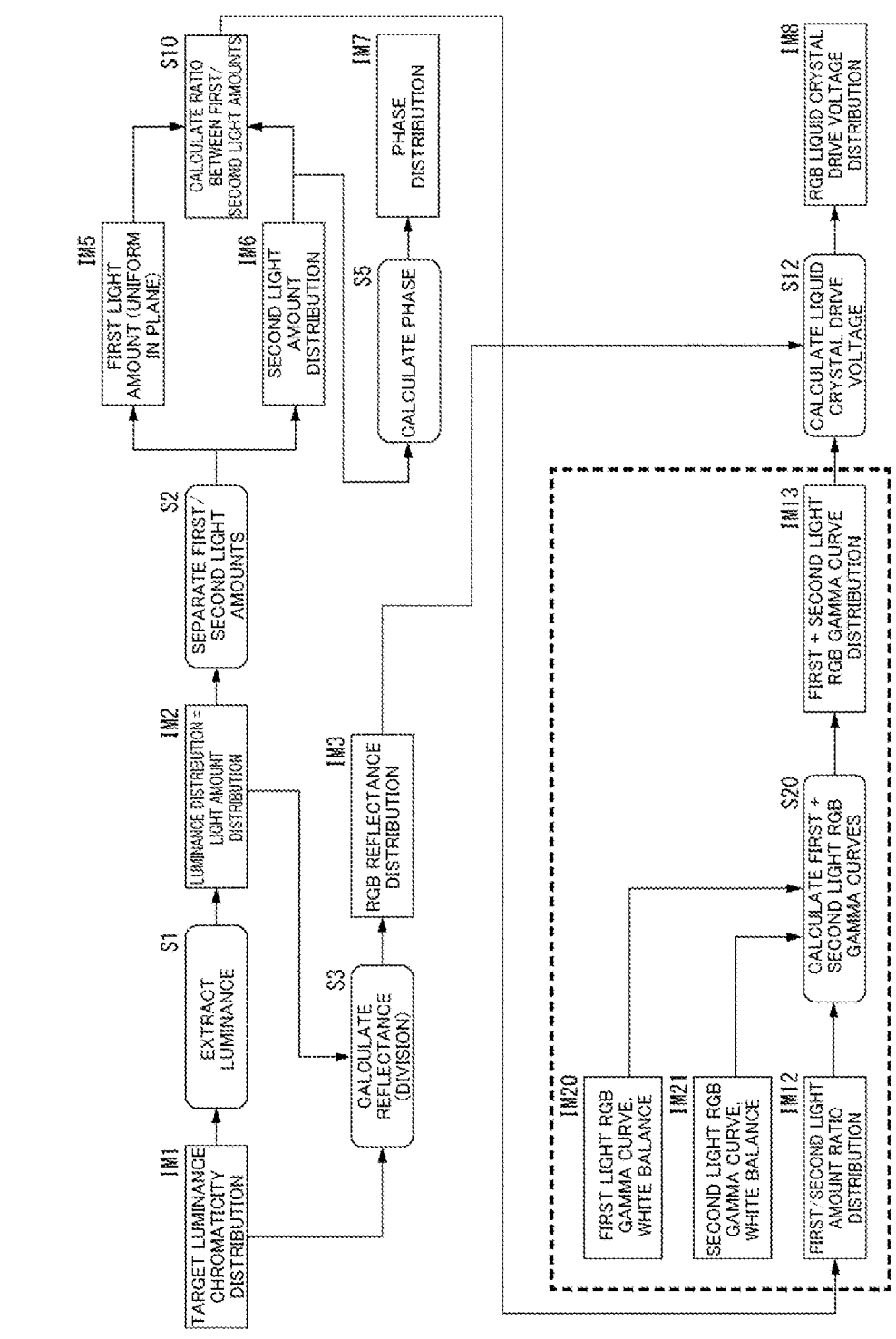
FIG. 16 is an explanatory diagram of signal processing according to a third embodiment.

Also, FIGS. 13, 14, and 16 illustrate content of signal processing as "S1", "S2", . . . and illustrates information input and output in regard to the processing as "IM1", "IM2", . . . . Although the three systems for R, G, and B are not distinguished from each other and are collectively illustrated in FIGS. 13, 14, and 16 for avoiding complication of the drawings, it should be understood that each item of information (IM) and each piece of processing (S) are performed independently for each of R, G, and B.

In the example in FIG. 13, the signal processing unit 10 acquires target luminance chromaticity distribution IM1 first. This is information representing in-plane distribution of luminance and chromaticity for the video to be projected, that is, corresponds to data of one frame of the video signal D.

The signal processing unit 10 takes information of luminance from the data of the one frame as the video signal D in luminance extraction processing S1.

In this manner, information as luminance distribution IM2 is obtained. The luminance distribution is information of light amount distribution that is desired to be realized through phase modulation and amplitude modulation.

The signal processing unit 10 performs first/second light amount separation processing S2 in accordance with the luminance distribution (light amount distribution) IM2. In this manner, the light amount of uniform in-plane light amount distribution is set as a light amount IM5 of the light source 1. Also, light amount distribution IM6 of increasing the light amount in a partial area or reducing the light amount in a partial area in accordance with content of the video is set as light amount distribution IM6 of the light source 2.

The signal processing unit 10 performs phase calculation processing S5 on the basis of the light amount distribution IM6 and obtains phase distribution IM7. Phase pattern signals PHr, PHg, and PHb illustrated in FIG. 5 are generated on the basis of the phase distribution IM7 and are supplied to the phase modulation elements 3R, 3G, and 3B.

On the other hand, the signal processing unit 10 performs reflectance calculation processing S3 in regard to amplitude modulation. This is performed by division of the target luminance chromaticity distribution IM1 and the luminance distribution (light amount distribution) IM2. In this manner reflectance distribution IM3 of each of R, G, and B is obtained.

Then, the signal processing unit 10 performs liquid crystal drive voltage calculation processing S4 for each of R, G, and B. The liquid crystal drive voltage is a value of voltage applied to each pixel of each of the amplitude modulation elements 5R, 5G, and 5B as the amplitude modulation drive signal Sd1 by the liquid crystal panel.

The liquid crystal voltage of each of R, G, and B is calculated by using the reflectance distribution IM3 of each of R, G, and B and the gamma curve. If the gamma curve C1 in FIG. 11 is set, for example, gradation of each pixel is guided from the reflectance of each pixel defined from the reflectance distribution IM3, and the liquid crystal drive voltage of each pixel is thus calculated in accordance with the gradation.

However, if the gamma curve C1 corresponding to the light source 1 is used or the gamma curve C2 corresponding to the light source 2 is used, the problem of color variations occurs as described above.

Thus, the gamma curve Cm obtained by using the representative ratio of light amounts of the first light source light 104 and the second light source light 106 which is obtained after phase modulation is used in the first embodiment. For example, an arithmetic operation using the ratio of the light amounts of the first light source light 104 and the second light source light 106 is performed on the gamma curves C1 and C2, for example, and the gamma curve Cm is thereby calculated. This is performed for each of R, G, and B. Therefore, gamma curves Cm calculated with the representative ratio of light amounts (each of which will be referred to as "CmR", "CmG", and "CmB") are obtained in advance for the amplitude modulation elements 5R, 5G, and 5B, respectively.

The signal processing unit 10 stores such gamma curves Cm corresponding to both the light sources 1 and 2 as information IM4.

Then, the signal processing unit 10 performs liquid crystal drive voltage calculation processing S4 by using the gamma curves Cmr, CmG, and CmB as the information IM4 set in advance by using these representative ratios of the light amounts in the processing of each frame.

Specifically, the signal processing unit 10 obtains liquid crystal drive voltage of each pixel of the amplitude modulation element 5R by using the reflectance distribution IM3 of the R light and the gamma curve CmR of the amplitude modulation element 5R for the R light.

Similarly, the signal processing unit 10 obtains the liquid crystal drive voltage of each pixel of the amplitude modulation element 5G by using the reflectance distribution IM3 of the G light and the gamma curve CmG of the amplitude modulation element 5G for the G light.

Also, the signal processing unit 10 obtains the liquid crystal drive voltage of each pixel of the amplitude modulation element 5B by using the reflectance distribution IM3 of the B light and the gamma curve CmB of the amplitude modulation element 5B for the B light.

Liquid crystal drive voltage distribution IM8 of each of R, G, and B is obtained through such calculation processing S4. Then, the amplitude modulation drive signal Sd1 corresponding to the voltage distribution is supplied to the amplitude modulation elements 5R, 5G, and 5B.

In the aforementioned processing example according to the first embodiment, the gamma curves CmR, CmG, and CmB of the amplitude modulation elements 5R, 5G, and 5B are gamma curves when the first light source light 104 and the second light source light 106 are added at a representative proportion.

Since the gamma curves CmR, CmG, and CmB are static, it is possible to eliminate color variations when the first light source light 104 and the second light source light 106 are incident at the proportion defined as the representative proportion while color variations occur at other proportions. However, it is possible to reduce the color variations as compared with a case where the gamma curve C1 in accordance with the light source 1 or the gamma curve C2 in accordance with the light source 2 is used.

Note that the first embodiment is effective in a case where two light sources in which wavelengths of each of R, G, and B are different are used and is also effective in a case where the phase modulation element 3 is not used. For example, a configuration in which light from two light sources is incident on the amplitude modulation element 5 corresponds thereto.

In such a case, distribution such as a sudden increase in light amount in a partial in-plane area does not occur in both the light sources 1 and 2, and the proportion of the in-plane light amount from each light source in each frame (time) becomes equal. Therefore, it is possible to prevent color variations from occurring by calculating the amplitude modulation drive signal Sd1 by using the gamma curve in accordance with the ratio of the amounts of light of the two light sources that is incident on the amplitude modulation element 5.

However, even in such a case of the configuration in which the phase modulation element 3 is not used, a color difference occurs between frames when the ratio of the light amounts from each light source differs depending on frames. Even in such a case, it is possible to reduce color variations by calculating the amplitude modulation drive signal Sd1 by using the gamma curve in accordance with the proportion of the representative light amounts of the two light sources.

5. Signal Processing According to Second Embodiment

A signal processing example according to a second embodiment is illustrated in FIG. 14. This is an example in which color variation correction is dynamically performed in a case where wavelengths of the primary color light are different between the light source 1 and the light source 2 and a liquid crystal panel is used as the amplitude modulation element 5.

In the example in FIG. 14, the signal processing unit 10 also acquires the target luminance chromaticity distribution IM1 as data for each frame of the video signal D.

Then, the signal processing unit 10 extracts information of luminance from data of one frame as the video signal D in the luminance extraction processing S1. In this manner, information as luminance distribution (light amount distribution) IM2 is obtained.

The signal processing unit 10 performs first/second light amount separation processing S2 in accordance with the luminance distribution (light amount distribution) IM2. In this manner, the light amount of uniform in-plane light amount distribution is set as a light amount IM5 of the light source 1. Also, light amount distribution IM6 of increasing the light amount in a partial area or reducing the light amount in a partial area in accordance with content of the video is set as light amount distribution IM6 of the light source 2.

The signal processing unit 10 performs phase calculation processing S5 on the basis of the light amount distribution IM6 and obtains phase distribution IM7. Phase pattern signals PHr, PHg, and PHb illustrated in FIG. 5 are generated on the basis of the phase distribution IM7 and are supplied to the phase modulation elements 3R, 3G, and 3B.

On the other hand, the signal processing unit 10 performs light amount ratio calculation processing S10 of the first light source light 104 and the second light source light 106 in regard to amplitude modulation. In other words, this is processing of calculating the ratio between the first light source light 104 and the second light source light 106 in each in-plane area from the light amount IM5 of the light source 1 and the light amount distribution IM6 for the light source 2. In this manner, light amount ratio distribution IM12 of the first light source light 104 and the second light source light 106 in this frame is obtained.

The signal processing unit 10 performs calculation processing S11 of calculating the gamma curve Cm in this frame by using information IM10 of the gamma curve C1 for the light source 1, information IM11 of the gamma curve C2 for the light source 2, and the light amount ratio distribution IM12.

Then, in-plane gamma curve distribution IM13 in accordance with the calculation result is obtained, and liquid crystal drive voltage calculation processing S12 is performed by using the gamma curve distribution IM13.

As the calculation processing S11 of the gamma curve Cm, each of the following (processing example a), (processing example b), and (processing example c) is conceivable.

(Processing example a) The gamma curve Cm to be applied to all the in-plane pixels in the current frame is obtained.

(Processing example b) The gamma curve Cm to be applied to each in-plane block in the current frame is obtained.

(Processing example c) The gamma curve Cm to be applied to each in-plane pixel in the current frame is obtained.

First, the example of the above (processing example a) will be described.

Figures 15A, 15B, 15C:
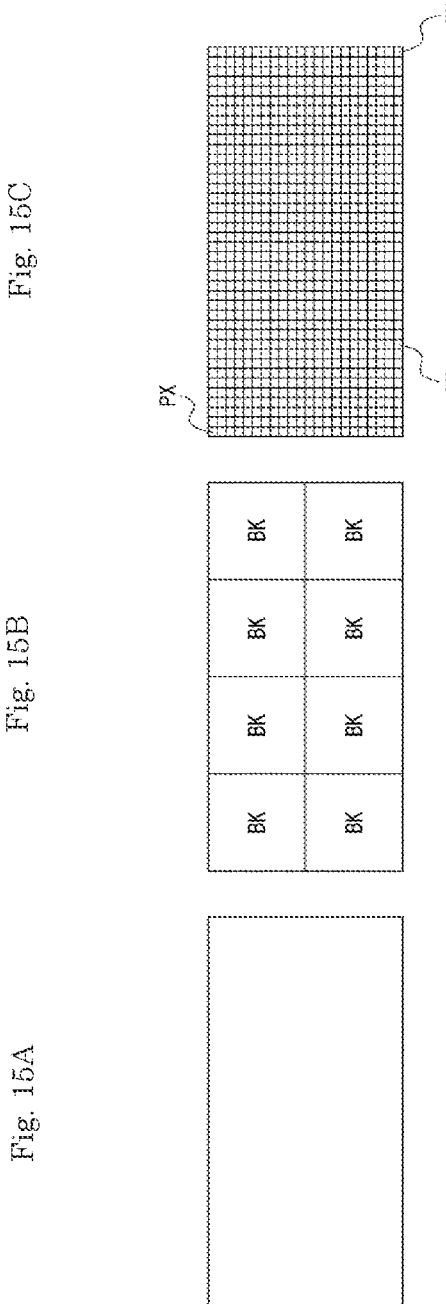
FIGS. 15A, 15B, 15C are explanatory diagrams of an in-plane area where gamma curve calculation is performed according to the embodiment.

FIG. 15A illustrates the entire in-plane area forming a video of one frame. The gamma curve Cm to be applied to all the in-plane pixels is calculated.

In this case, a representative light amount ratio is obtained from the light amount ratio distribution IM12 in this frame. Then, the gamma curve Cm to which each of proportions of the gamma curve C1 for the light source 1 and the gamma curve C2 for the light source 2 is reflected is calculated by using the representative light amount ratio.

Specifically, the signal processing unit 10 calculates gamma curves CmR, CmG, and CmB calculated with the representative light amount ratio in this frame correspondingly to each of the amplitude modulation elements 5R, 5G, and 5B by such a method.

In other words, the signal processing unit 10 obtains the gamma curve CmR to be applied to the amplitude modulation element 5R for this frame by using the light amount ratio distribution IM12 of the R light in this frame and the gamma curves C1 and C2 corresponding to the light source 1 and the light source 2 for the amplitude modulation element 5R.

Similarly, the signal processing unit 10 obtains the gamma curve CmG to be applied to the amplitude modulation element 5G for this frame by using the light amount ratio distribution IM12 of the G light in this frame and the gamma curves C1 and C2 corresponding to the light source 1 and the light source 2 for the amplitude modulation element 5G.

Further, the signal processing unit 10 obtains the gamma curve CmB to be applied to the amplitude modulation element 5B for this frame by using the light amount ratio distribution IM12 of the B light in this frame and the gamma curves C1 and C2 corresponding to the light source 1 and the light source 2 for the amplitude modulation element 5B.

In this manner, the gamma curves CmR, CmG, and CmB to be applied to this frame are obtained. However, in the case of the (processing example a), the gamma curve distribution IM13 is uniform in the plane.

Then, the signal processing unit 10 obtains a liquid crystal drive voltage of each pixel of the amplitude modulation elements 5R, 5G, and 5B by using the reflectance distribution IM3 of each of R, G, and B obtained by division of the target luminance chromaticity distribution IM1 and the luminance distribution (light amount distribution) IM2 and the gamma curves CmR, CmG, and CmB in the liquid drive voltage calculation processing S12. In this manner, the liquid crystal drive voltage distribution IM8 of each of R, G, and B is obtained, and the amplitude modulation drive signal Sd1 corresponding to the voltage distribution is supplied to the amplitude modulation elements 5R, 5G, and 5B.

According to the (processing example a), it is possible to enhance the effect of reducing color variations as compared with the first embodiment by the gamma curve Cm being dynamically obtained in accordance with the ratio between the first light source light 104 and the second light source light 106 in the frame and by the amplitude modulation drive signal Sd1 being obtained for each frame.

Next, the example of the above (processing example b) will be described.

FIG. 15B illustrates an example in which the in-plane part forming a video in one frame is split into some blocks BK. One block is an area configured of a plurality of pixels. Although the example in which the in-plane part of one frame is split into eight blocks BK is illustrated here, the number of blocks BK into which the in-plane part is split, the number of pixels configuring each block BK, and the shape of each block BK are conceivable in various manners.

The signal processing unit 10 obtains a representative light amount ratio for each block BK from the light amount ratio distribution IM12 in this frame on the basis of such setting of the blocks BK. Then, the gamma curve Cm to which each of proportions of the gamma curve C1 for the light source 1 and the gamma curve C2 for the light source 2 is reflected is calculated by using the representative light amount ratio for each block BK.

Specifically, the signal processing unit 10 obtains the gamma curve CmR to be applied for each block BK of the amplitude modulation element 5R for this frame by using the light amount ratio distribution IM12 for each block BK of the R light in this frame and the gamma curves C1 and C2 corresponding to the light source 1 and the light source 2 for the amplitude modulation element 5R in the calculation processing S11. For example, the gamma curve CmR to be applied to each block BK is obtained like the gamma curve CmR (BK1) for the first block BK, the gamma curve CmR (BK2) for the second block BK, . . . , Cmr (BKm). Note that "m" is the number of blocks.

For the amplitude modulation element 5G, the gamma curve CmG to be applied to each block BK, that is, the gamma curves CmG (BK1), CmG (BK2), . . . , CmG (BKm) in this case are obtained in a similar manner.

For the amplitude modulation element 5B, the gamma curve CmB to be applied to each block BK, that is, the gamma curves CmB (BK1), CmB (BK2), . . . , CmB (BKm) in this case are obtained in a similar manner.

In this manner, gamma curve distribution IM13 in which the gamma curve differs for each block BK is obtained by obtaining the gamma curves CmR, CmG, and CmB to be applied to each block BK in this frame.

Then, the signal processing unit 10 obtains a liquid crystal drive voltage of each of the pixels of the amplitude modulation elements 5R, 5G, and 5B in the calculation processing S12 using the reflectance distribution IM3 of each of R, G, and B and the gamma curves CmR, CmG, and CmB for each block BK. In this manner, the liquid crystal drive voltage distribution IM8 of each of R, G, and B is obtained, and the amplitude modulation drive signal Sd1 corresponding to the voltage distribution is supplied to the amplitude modulation elements 5R, 5G, and 5B.

According to the (processing example b), it is possible to further enhance the effect of reducing color variations by the gamma curve Cm being dynamically obtained on the basis of the ratio between the first light source light 104 and the second light source light 106 and by the amplitude modulation drive signal Sd1 being obtained, for each frame and for each block BK in each frame.

Next, an example of the above (processing example c) will be described.

FIG. 15C illustrates each in-plane pixel PX forming a video in one frame. One grid represents one pixel. Note that the drawing provides schematic illustration and the number of pixels is not the actual number.

Also, the signal processing unit 10 calculates the gamma curve Cm to which each of proportions of the gamma curve C1 for the light source 1 and the gamma curve C2 for the light source 2 is reflected by using the light amount ratio indicated for each pixel PX in the light amount ratio distribution IM12 in this frame in the calculation processing S11.

Specifically, the gamma curve CmR to be applied is obtained for each pixel PX of the amplitude modulation element 5R in this frame by using the light amount ratio for each pixel PX of the R light in this frame and the gamma curves C1 and C2 corresponding to the light source 1 and light source 2 for the amplitude modulation element 5R. For example, the gamma curve CmR to be applied to each pixel PX is obtained, like a gamma curve CmR (PX1), CmR (PX2), . . . , CmR (PXn). Note that "n" is the number of pixels.

For the amplitude modulation element 5G, the gamma curve CmG to be applied to each pixel PX, that is, the gamma curves CmG (PX1), CmG (PX2), . . . , CmG (PXn) in this case are obtained in a similar manner.

For the amplitude modulation element 5B, the gamma curve CmB to be applied to each pixel PX, that is, the gamma curves CmB (PX1), CmB (PX2), . . . , CmB (PXn) in this case are obtained in a similar manner.

The gamma curve distribution IM13 in which the gamma curve differs for each pixel PX is obtained by obtaining the gamma curves CmR, CmG, and CmB to be applied to each pixel PX in this frame in this manner.

Then, the signal processing unit 10 obtains a liquid crystal drive voltage of each of pixels of the amplitude modulation elements 5R, 5G, and 5B in the calculation processing S12 using the reflectance distribution IM3 of each of R, G, and B and the gamma curves CmR, CmG, and CmB of each pixel PX. In this manner, the liquid crystal drive voltage distribution IM8 of each of R, G, and B is obtained, and the amplitude modulation drive signal Sd1 corresponding to the voltage distribution is supplied to the amplitude modulation elements 5R, 5G, and 5B.

According to the (processing example c), it is possible to cancel color variations by the gamma curve Cm in accordance with the ratio between the first light source light 104 and the second light source light 106 being obtained and by the amplitude modulation drive signal Sd1 being obtained, for each frame and each pixel PX thereof.

Note that although the examples in which the gamma curve Cm is obtained for each block Bk or for each pixel PX has been described in the above (processing example b) and (processing example c), it is also possible to apply such an example in which the gamma curve Cm is obtained for each in-plane area to the first embodiment.

In other words, the representative proportions of the first light source light 104 and the second light source light 106 are obtained for each block BK or for each pixel PX in the first embodiment. Then, fixed gamma curves CmR, CmG, and CmB for static correction may be prepared for each block BK or for each pixel PX, and these may be used for calculation of the amplitude modulation drive signal Sd1.

6. Signal Processing According to Third Embodiment

A third embodiment will be described in FIG. 16. Note that since the processing example in FIG. 16 includes many points similar to those in FIG. 14, the same reference signs will be applied to the same processing or information, and only different points will be described.

In FIG. 16, the signal processing unit 10 performs calculation processing S20 of calculating the gamma curve Cm in this frame by using information IM20 of the gamma curve C1 and the white balance for the light source 1, information IM21 of the gamma curve C2 and the white balance for the light source 2, and the light amount ratio distribution IM12.

Therefore, the thus obtained gamma curves CmR, CmG, and CmB are ones on the assumption of differences in the light amount ratios and the white balances.

Then, the signal processing unit 10 obtains the in-plane gamma curve distribution IM13 in accordance with the calculation result of the calculation processing S20 and performs the liquid crystal drive voltage calculation processing S12 by using the gamma curve distribution IM13. The other parts are similar to those in FIG. 14. Also, processing corresponding to each of (processing example a), (processing example b), and (processing example c) described in FIG. 14 is conceivable in this case as well.

In the case of the third embodiment, it is possible to realize color variation correction to reduce even an influence of a difference in white balances of the light source 1 and the light source 2 in a case where the white balances are different from each other.

7. Conclusion and Modification Example

According to the above embodiments, the following effects are obtained.

The projector apparatus according to the embodiments includes: the light source 1 (first light source) configured to output the first light source light 104; and the light source 2 (second light source) configured to output the second light source light 106, the wavelength of the primary color light of the light source 2 being different from the wavelength of the primary color light of the light source 1. Also, the projector apparatus includes: the amplitude modulation element 5 on which the first light source light 104 and the second light source light 106 are incident, the amplitude modulation element 5 being configured to perform amplitude modulation on incident light; and the signal processing unit 10 configured to generate the amplitude modulation drive signal Sd1 for the amplitude modulation element 5 on the basis of the gamma curve Cm in accordance with the ratio between the first light source light 104 and the second light source light 106 that are incident on the amplitude modulation element 5.

The R light, the G light, and the B light of each of the first light source light 104 and the second light source light 106 are incident on the amplitude modulation element 5, and the primary color light has mutually different wavelength. Therefore, both the gamma curve C1 of the amplitude modulation element 5 on the assumption of the light source 1 and the gamma curve C2 of the amplitude modulation element 5 in the case where the light source 2 is assumed do not become gamma curves for obtaining projection video light with appropriate gradation, and color variations occur, as described in FIGS. 7 and 8. Thus, the gamma curve corresponding to the ratio between the first light source light 104 and the second light source light 106 is calculated, and the amplitude modulation drive signal is generated on the basis of it. In this manner, it is possible to generate the amplitude modulation drive signal based on the more appropriate gamma curve and to reduce or cancel color variations.

Note that a configuration that does not include the projection lens 9 in the configuration in FIG. 5 can be considered as a light source device. Therefore, the present technology can also be applied to a light source device that is not configured as a projector apparatus.

The configuration example in the embodiments includes the phase modulation element 3 configured to convert the light amount distribution of the light from the light source 2, and both the first light source light 104 and the second light source light 106 which has passed through the phase modulation element 3 are incident on the amplitude modulation element 5.

The wavelengths of the R light, the G light, and the B light are different from each other between the first light source light 104 and the second light source light 106 that are incident on the amplitude modulation element 5, and further, the second light source light 106 has light amount distribution that is not uniform due to the phase modulation element 3. Therefore, the ratio of the light amounts of the first light source light 104 and the second light source light 106 that are incident on the amplitude modulation element varies depending on frames or in-plane areas. In such a case, the problem of color variations increases if the amplitude modulation drive signal Sd1 is generated by using the gamma curve C1 on the assumption of the light source 1 and the gamma curve C2 on the assumption of the light source 2. Thus, calculating the gamma curve corresponding to the ratio between the first light source light 104 and the second light source light 106 which has passed through the phase modulation element 3 and generating the amplitude modulation drive signal Sd1 on the basis of it are effective in such a configuration. In this manner, it is possible to generate the amplitude modulation drive signal based on the more appropriate gamma curve and to reduce or cancel color variations.

The amplitude modulation drive signal Sd1 described in the embodiments is a signal for performing light amount control of each pixel of the amplitude modulation element 5 in accordance with the video signal D, and the control value of each pixel of the amplitude modulation element 5 in accordance with the gradation value of each pixel in the video signal D is generated on the basis of the gamma curve Cm in accordance with the ratio between the first light source light 104 and the second light source light 106.

Radiation of video light in accordance with the video signal is performed through projection video by the reflectance or the transmittance of the amplitude modulation element 5 being controlled with the amplitude modulation drive signal Sd1 in accordance with the video signal D and by the light amount control being performed.

In this case, amplitude modulation suitable for synthesized light is performed by the control value of each pixel, for example, the drive voltage value of the liquid crystal panel being set on the basis of the gamma curve Cm in accordance with the ratio between the first light source light 104 and the second light source light 106 which is obtained after the phase modulation being set, and color variation can thus be reduced or solved.

In the second embodiment, the case where the signal processing unit 10 obtains the gamma curve Cm in accordance with the ratio between the first light source light 104 and the second light source light 106 that are incident on the amplitude modulation element 5 for each frame of the video signal D and generates the amplitude modulation drive signal Sd1 has been described.

In a case where the ratio between the first light source light 104 and the second light source light 106 which is obtained after the phase modulation that are incident on the amplitude modulation element 5 changes for each frame of the video signal, it is possible to improve the effect of reducing color variations by calculating the gamma curve Cm suitable for each frame and generating the amplitude modulation drive signal Sd1 by using the gamma curve Cm.

In the second embodiment, the example in which the signal processing unit 10 obtains the gamma curve Cm in accordance with the ratio between the first light source light 104 and the second light source light 106 that are incident for each pixel block BK obtained by splitting the in-plane area of the amplitude modulation element 5 and generates the amplitude modulation drive signal Sd1 has been described (processing example b).

In one screen of a projection video, light amount distribution achieved by the phase modulation element 3 changes. Therefore, the light amount ratio of the first light source light 104 and the second light source light 106 differs in the in-plane part of the amplitude modulation element 5. Thus, the gamma curve Cm in accordance with the ratio between the first light source light 104 and the second light source light 106 that are incident on the amplitude modulation element 5 is calculated for each pixel block BK obtained by splitting the in-plane part of the amplitude modulation element 5, and the amplitude modulation drive signal Sd1 is generated by using the gamma curve Cm as in the (processing example b). In this manner, amplitude modulation driving is performed correspondingly to the light amount ratio for each area of each block BK in the in-plane part, and it is possible to improve the effect of reducing color variations. Particularly, it is possible to handle both the difference in light amount ratio in the in-plane area and the difference in light amount ratio along the time axis by calculating the gamma curve Cm for each block BK for each frame, and a more significant effect of reducing color variations is achieved.

Note that using the gamma curve Cm for each block BK as in the (processing example b) is also effective for the case where static color variation correction is performed in the first embodiment.

In the second embodiment, the example in which the signal processing unit 10 obtains the gamma curve Cm in accordance with the ratio between the first light source light 104 and the second light source light 106 that are incident for each pixel PX of the amplitude modulation element 5 and generates the amplitude modulation drive signal Sd1 has been described (processing example c).

In one screen of a projection video, the light amount distribution achieved by the phase modulation element 3 changes for each pixel PX, and the light amount ratio between the first light source light 104 and the second light source light 106 in the in-plane part of the amplitude modulation element 5 differs for each pixel PX. Thus, the gamma curve Cm in accordance with the ratio between the first light source light 104 and the second light source light 106 that are incident on the amplitude modulation element 5 is calculated, and the amplitude modulation drive signal Sd1 is generated by using the gamma curve Cm, for each pixel PX of the amplitude modulation element 5 as in the (processing example c). In this manner, the amplitude modulation driving is performed correspondingly to the light amount ratio for each pixel in the in-plane part, and it is possible to effectively reduce color variations.

Particularly, it is possible to handle both the difference in light amount ratios for each pixel in the in-plane part and the difference in light amount ratios along the time axis by calculating the gamma curve Cm for each pixel PX for each frame, and it is possible to substantially cancel occurrence of color variations.

Note that using the gamma curve Cm for each pixel PX as in the (processing example c) is also effective for the case where static color variation correction in the first embodiment is performed.

In the first embodiment, the signal processing unit 10 obtains the gamma curve Cm in accordance with the representative value of the ratio between the first light source light 104 and the second light source light 106 that are incident on the amplitude modulation element 5 and generates the amplitude modulation drive signal Sd1.

It is possible to obtain the effect of reducing color variations by generating the amplitude modulation drive signal Sd1 by using the gamma curve Cm in accordance with the representative ratio as the ratio between the first light source light 104 and the second light source light 106. This is a static color variation reducing method in the case where the wavelengths and the white balances of the primary color light are different between the light source 1 and the light source 2, and it is possible to realize color variation reduction in a state where a processing load is relatively low.

In the third embodiment, the example in which the signal processing unit 10 generates the amplitude modulation drive signal Sd1 of correcting a difference in white balances between the light source 1 and the light source 2 has been illustrated.

As described in FIG. 16, the effect of reducing color variations caused by the difference in white balances can also be obtained by including the difference in white balances between the light source 1 and the light source 2 in the calculation of the gamma curve Cm.

In the embodiments, the phase modulation element 3 is adapted to convert incident light into outgoing light with a different beam density for each in-plane area in response to the phase pattern signals PHr, PHg, and PHb generated on the basis of the video signal D.

It is possible to obtain projection video light 107 with light amount distribution including a partial increase or decrease in light amount in accordance with the video signal D by causing such a phase modulation element 3 to intervene and to realize video projection in a wide dynamic range.

In the embodiments, the amplitude modulation element 5 is configured of a liquid crystal panel or a DMD. It is possible to reduce color variations correspondingly to a device type of the amplitude modulation element 5 by calculating the gamma curve Cm corresponding to the ratio between the first light source light 104 and the second light source light 106 in accordance with properties of the liquid crystal panel or the DMD and generating the amplitude modulation drive signal Sd1 on the basis of it.

In the embodiments, the example in which the wavelengths of the red light of the light source 1 and the red light of the light source 2 are different from each other, the wavelengths of the green light of the light source 1 and the green light of the light source 2 are different from each other, and the wavelengths of the blue light of the light source 1 and the blue light of the light source 2 are different from each other has been illustrated as the primary color light.

The differences of the wavelengths of the R light, the G light, and the B light between the light source 1 and the light source 2 lead to color variations. In this case, generating the amplitude modulation drive signal Sd1 based on the gamma curve in accordance with the light amount ratio is particularly effective for improving image quality through reduction of color variations.

Note that a case where partial wavelengths of the R light of the first light source and the R light, the G light, and the B light of the second light source are different from each other between the first light source and the second light source is also assumed, for example, and it is possible to apply the technology of the embodiments to that case as well.

In the embodiments, one of the light source 1 and the light source 2 is a laser light source, and the other is configured of another light source device.

It is possible to realize an increase in luminance of the projection video at relatively low cost by employing the laser light source as one of the light source 1 and the light source 2 and another light source device, such as a fluorescent light source, as the other one. Although color variations occur due to a difference in wavelengths of the primary color light in this case, it is possible to reduce or cancel the color variations by the technology described in the embodiment. As a result, it is possible to realize a projector apparatus realizing a projection video with high luminance and high quality at relatively low cost.

Note that although the configuration in which color video projection of R, G, and B is performed has been illustrated as an example in the embodiments, the present technology is also effective for a case where primary color light of another combination is used. Also, the present technology can also be applied to a projector apparatus and a light source device that performs monochrome video projection.

Note that the advantageous effects described in the present specification are merely exemplary and are not limited, and other advantageous effects may be obtained.

Note that the present technology can also adopt the following configurations.

(1)

A projector apparatus including:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on the basis of a gamma curve in accordance with a ratio between the first light source light and the second light source light that are incident on the amplitude modulation element.

(2)

The projector apparatus according to (1) above, further including:

a phase modulation element configured to convert light amount distribution of the second light source light, in which both the first light source light and the second light source light that have passed through the phase modulation element are incident on the amplitude modulation element.

(3)

The projector apparatus according to (1) or (2) above, in which the amplitude modulation drive signal is a signal for controlling a light amount of each pixel of the amplitude modulation element in accordance with a video signal, and a control value of each pixel of the amplitude modulation element in accordance with a gradation value of each pixel in the video signal is generated on the basis of the gamma curve in accordance with the ratio between the first light source light and the second light source light.

(4)

The projector apparatus according to any of (1) to (3) above, in which the signal processing unit generates the amplitude modulation drive signal by obtaining the gamma curve in accordance with the ratio between the first light source light and the second light source light that are incident on the amplitude modulation element for each frame of the video signal.

(5)

The projector apparatus according to any of (1) to (4), in which the signal processing unit generates the amplitude modulation drive signal by obtaining the gamma curve in accordance with the ratio between the incident first light source light and second light source light for each pixel block obtained by splitting an in-plane part of the amplitude modulation element.

(6)

The projector apparatus according to any of (1) to (4) above, in which the signal processing unit generates the amplitude modulation drive signal by obtaining the gamma curve in accordance with the ratio between the incident first light source light and second light source light for each pixel of the amplitude modulation element.

(7)

The projector apparatus according to any of (1) to (3) above, in which the signal processing unit generates the amplitude modulation drive signal by obtaining a gamma curve in accordance with a representative value of the ratio between the first light source light and the second light source light that are incident on the amplitude modulation element.

(8)

The projector apparatus according to any of (1) to (7) above, in which the signal processing unit generates the amplitude modulation drive signal for correcting a difference in white balances of the first light source and the second light source.

(9)

The projector apparatus according to (2) above, in which the phase modulation element converts the incident light into outgoing light with different beam density for each in-plane area in accordance with a phase pattern generated on the basis of a video signal.

(10)

The projector apparatus according to any of (1) to (9) above, in which the amplitude modulation element is configured of a liquid crystal panel.

(11)

The projector apparatus according to any of (1) to (9) above, in which the amplitude modulation element is configured of a digital micromirror device.

(12)

The projector apparatus according to any of (1) to (11), in which as the primary color light, wavelengths of red light of the first light source and red light of the second light source are different from each other, wavelengths of green light of the first light source and green light of the second light source are different from each other, and wavelengths of blue light of the first light source and blue light of the second light source are different from each other.

(13)

The projector apparatus according to any of (1) to (11) above, in which one of the first light source and the second light source is a laser light source, and the other is configured of another light source device.

(14)

A light source device including:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on the basis of a gamma curve in accordance with a ratio between the first light source light and the second light source light that are incident on the amplitude modulation element.

(15)

A light source drive method for a light source device including a first light source configured to output first light source light, a second light source configured to output second light source light, a wavelength of primary color light of the second light source being different from a wavelength of primary color light of the first light source, and an amplitude modulation element on which both the first light source light and the second light source light are incident, the amplitude modulation element being configured to perform amplitude modulation on incident light, the method including:

driving the amplitude modulation element with an amplitude modulation drive signal generated on the basis of a gamma curve in accordance with a ratio between the first light source light and the second light source light that are incident on the amplitude modulation element.

REFERENCE SIGNS LIST

1 Light source (first light source)
2 Light source (second light source)
3, 3R, 3G, 3B Phase modulation element
4 Multiplexing optical system
5, 5R, 5G, 5B Amplitude modulation element
6 Second illumination optical system
7 Relay optical system
8 First illumination optical system
9 Projection lens
10 Signal processing unit
11 Image creation signal processing unit
12 Phase pattern generation unit
104 First light source light
105, 106 Second light source light
107 Projection video light
110 Reflectance distribution

What is claimed is:

1. A projector apparatus, comprising:
a first light source configured to output first light source light;
a second light source configured to output second light source light, a wavelength of primary color light of the second light source being different from a wavelength of primary color light of the first light source;
an amplitude modulation element on which both the first light source light and the second light source light are incident, the amplitude modulation element being configured to perform amplitude modulation on incident light;
a signal processing unit configured to generate an amplitude modulation drive signal for the amplitude modulation element on a basis of a gamma curve in accordance with a ratio between the first light source light and the second light source light that are incident on the amplitude modulation element; and
a phase modulation element configured to convert light amount distribution of the second light source light,
wherein both the first light source light and the second light source light that has passed through the phase modulation element are incident on the amplitude modulation element.

2. The projector apparatus according to claim 1, wherein the phase modulation element
converts the incident light into outgoing light with a different beam density for each in-plane area in accordance with a phase pattern generated on the basis of a video signal.

3. The projector apparatus according to claim 1, wherein the amplitude modulation element is configured of a liquid crystal panel.

4. The projector apparatus according to claim 1, wherein the amplitude modulation element is configured of a digital micromirror device.

5. The projector apparatus according to claim 1, wherein as the primary color light,
wavelengths of red light of the first light source and red light of the second light source are different from each other, wavelengths of green light of the first light source and green light of the second light source are different from each other, and wavelengths of blue light of the first light source and blue light of the second light source are different from each other.

6. The projector apparatus according to claim 1, wherein a first one of the first light source and the second light source is a laser light source, and a second one of the first light source and the second light source is configured of another light source device.

7. The projector apparatus according to claim 1,
wherein the amplitude modulation drive signal is a signal for controlling a light amount of each pixel of the amplitude modulation element in accordance with a video signal, and
a control value of each pixel of the amplitude modulation element in accordance with a gradation value of each pixel in the video signal is generated on the basis of the gamma curve in accordance with the ratio between the first light source light and the second light source light.

8. The projector apparatus according to claim 1, wherein the signal processing unit
generates the amplitude modulation drive signal by obtaining the gamma curve in accordance with the ratio between the first light source light and the second light source light that are incident on the amplitude modulation element for each frame of a video signal.

9. The projector apparatus according to claim 1, wherein the signal processing unit
generates the amplitude modulation drive signal by obtaining the gamma curve in accordance with the ratio between the incident first light source light and second light source light for each pixel block obtained by splitting an in-plane part of the amplitude modulation element.

10. The projector apparatus according to claim 1, wherein the signal processing unit
generates the amplitude modulation drive signal by obtaining the gamma curve in accordance with the ratio between the incident first light source light and second light source light for each pixel of the amplitude modulation element.

11. The projector apparatus according to claim 1, wherein the signal processing unit
generates the amplitude modulation drive signal by obtaining a gamma curve in accordance with a representative value of the ratio between the first light source light and the second light source light that are incident on the amplitude modulation element.

12. The projector apparatus according to claim 1, wherein the signal processing unit
generates the amplitude modulation drive signal for correcting a difference in white balances of the first light source and the second light source.

13. A projector apparatus, comprising:
a first light source configured to output first light source light;
a second light source configured to output second light source light, a wavelength of primary color light of the second light source being different from a wavelength of primary color light of the first light source;
an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on a basis of a gamma curve in accordance with a ratio between the first light source light and the second light source light that are incident on the amplitude modulation element, wherein the amplitude modulation drive signal is a signal for controlling a light amount of each pixel of the amplitude modulation element in accordance with a video signal, and wherein a control value of each pixel of the amplitude modulation element in accordance with a gradation value of each pixel in the video signal is generated on the basis of the gamma curve in accordance with the ratio between the first light source light and the second light source light.

14. The projector apparatus according to claim 13, wherein the signal processing unit generates the amplitude modulation drive signal by obtaining the gamma curve in accordance with the ratio between the first light source light and the second light source light that are incident on the amplitude modulation element for each frame of a video signal.

15. The projector apparatus according to claim 13, wherein the signal processing unit generates the amplitude modulation drive signal by obtaining the gamma curve in accordance with the ratio between the incident first light source light and second light source light for each pixel block obtained by splitting an in-plane part of the amplitude modulation element.

16. A projector apparatus, comprising:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on a basis of a gamma curve in accordance with a ratio between the first light source light and the second light source light that are incident on the amplitude modulation element, wherein the signal processing unit generates the amplitude modulation drive signal by obtaining the gamma curve in accordance with the ratio between the first light source light and the second light source light that are incident on the amplitude modulation element for each frame of a video signal.

17. A projector apparatus, comprising:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on a basis of a gamma curve in accordance with a ratio between the first light source light and the second light source light that are incident on the amplitude modulation element, wherein the signal processing unit generates the amplitude modulation drive signal by obtaining the gamma curve in accordance with the ratio between the incident first light source light and second light source light for each pixel block obtained by splitting an in-plane part of the amplitude modulation element.

18. A projector apparatus, comprising:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on a basis of a gamma curve in accordance with a ratio between the first light source light and the second light source light that are incident on the amplitude modulation element, wherein the signal processing unit generates the amplitude modulation drive signal by obtaining the gamma curve in accordance with the ratio between the incident first light source light and second light source light for each pixel of the amplitude modulation element.

19. A projector apparatus, comprising:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on a basis of a gamma curve in accordance with a ratio between the first light source light and the second light source light that are incident on the amplitude modulation element, wherein the signal processing unit generates the amplitude modulation drive signal by obtaining a gamma curve in accordance with a representative value of the ratio between the first light source light and the second light source light that are incident on the amplitude modulation element.

20. A projector apparatus, comprising:

a first light source configured to output first light source light;

a second light source configured to output second light source light, a wavelength of primary color light of the second light source being different from a wavelength of primary color light of the first light source;

an amplitude modulation element on which both the first light source light and the second light source light are incident, the amplitude modulation element being configured to perform amplitude modulation on incident light; and a signal processing unit configured to generate an amplitude modulation drive signal for the amplitude modulation element on a basis of a gamma curve in accordance with a ratio between the first light source light and the second light source light that are incident on the amplitude modulation element, wherein the signal processing unit generates the amplitude modulation drive signal for correcting a difference in white balances of the first light source and the second light source.

* * * * *